United States Patent
Richardson (10) Patent No.: US 10,883,611 B2
(45) Date of Patent: Jan. 5, 2021

(54) REPLACEABLE VALVE PLUG TIP

(71) Applicant: FISHER CONTROLS INTERNATIONAL LLC, Marshalltown, IA (US)

(72) Inventor: Jonathan W. Richardson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 52 days.

(21) Appl. No.: 15/723,024

(22) Filed: Oct. 2, 2017

(65) Prior Publication Data
US 2019/0101215 A1 Apr. 4, 2019

(51) Int. Cl.
*F16K 1/36* (2006.01)
*F16B 2/06* (2006.01)
*F16K 1/48* (2006.01)
*F16K 1/42* (2006.01)

(52) U.S. Cl.
CPC ............... *F16K 1/36* (2013.01); *F16B 2/06* (2013.01); *F16K 1/422* (2013.01); *F16K 1/482* (2013.01)

(58) Field of Classification Search
CPC . F16B 2/06; F16K 1/36; F16K 25/005; F16K 27/0254; F16K 1/48; F16K 1/1842; F16K 1/485; F16K 1/487; F16K 1/34; F16K 1/385
USPC ............... 251/318, 122, 324, 84, 319, 291; 403/314, 312, 310, 373, 374.1
See application file for complete search history.

(56) References Cited

U.S. PATENT DOCUMENTS

| | | | |
|---|---|---|---|
| 2,067,271 A * | 1/1937 | Johnson | E21B 17/046 403/310 |
| 9,316,321 B2 * | 4/2016 | McCarty | F16K 1/48 |
| 2004/0155219 A1 * | 8/2004 | McCarty | F16B 7/0426 251/357 |
| 2007/0164560 A1 * | 7/2007 | McCarty | F16K 1/48 285/1 |
| 2009/0049671 A1 * | 2/2009 | O'Hara | F16K 1/48 29/213.1 |
| 2012/0286183 A1 * | 11/2012 | McCarty | F16K 1/48 251/357 |
| 2013/0319541 A1 | 12/2013 | Haines et al. | |

OTHER PUBLICATIONS

International Search Report for Application No. PCT/US2018/052591 dated Sep. 25, 2018.
Written Opinion for Application No. PCT/US2018/052591 dated Sep. 25, 2018.

* cited by examiner

*Primary Examiner* — Kelsey E Cary
(74) *Attorney, Agent, or Firm* — Marshall, Gerstein & Borun LLP (57) ABSTRACT

A valve plug assembly includes a valve plug base, a valve plug tip, and a clamp that removably couples the valve plug tip to the valve plug base. The valve plug base includes a base body portion arranged for attachment to the valve stem and a base mating portion coupled to the base body portion. The valve plug tip has a tip body portion and a tip mating portion coupled to the tip body portion, the tip body portion having a sealing surface arranged to sealingly engage the valve seat. The clamp includes a clamp bore sized to receive at least a portion of the base mating portion and at least a portion of the tip mating portion.

20 Claims, 4 Drawing Sheets

REPLACEABLE VALVE PLUG TIP

FIELD OF THE DISCLOSURE

The present disclosure generally relates to a control valve assembly and, more particularly, to a valve plug assembly including a removable and replaceable valve plug tip.

BACKGROUND OF THE INVENTION

In many valve applications, a valve plug tip is coupled to a valve plug base, and the valve plug base is operatively coupled to an actuation mechanism that displaces the valve plug base and the valve plug tip such that a sealing surface on the valve plug tip sealingly engages a valve seat or disengages from the valve seat to close or open the valve, respectively. Several valve applications, particularly those highly erosive and/or corrosive in nature, require that the valve plug tip be fabricated from a material that resists both corrosion and erosion. Accordingly, the valve plug tip is often made from a ceramic material and/or carbide material, such as tungsten carbide. However, because it is difficult, if not impossible, to form threads on ceramic and carbide materials, a valve plug tip made of ceramic and/or carbide must be permanently coupled to the valve plug base, made of metal, by, for example, brazing or stress fitting. In other words, it is very difficult, if not impossible, to manufacture a ceramic and/or carbide valve plug tip that can be removably coupled to the plug base and the valve plug base. However, when a valve plug tip that is permanently coupled to the valve plug base is damaged (e.g., due to erosion), the entire valve plug assembly (and sometimes the valve stem) must be replaced, a costly and time-consuming process.

BRIEF SUMMARY OF THE INVENTION

In accordance with a first exemplary aspect of the present invention, a valve plug assembly is provided for use in a control valve assembly having a valve stem, a fluid flow passageway, and a valve seat disposed in the fluid flow passageway. The valve plug assembly includes a valve plug base, a valve plug tip, and a clamp that removably couples the valve plug tip to the valve plug base. The valve plug base extends along a plug base axis and includes a base body portion arranged for attachment to the valve stem and a base mating portion coupled to the base body portion. The valve plug tip extends along a plug axis coaxially aligned with the plug base axis, and has a tip body portion and a tip mating portion coupled to the tip body portion, the tip body portion having a sealing surface arranged to sealingly engage the valve seat. The clamp extends along a clamp axis coaxially aligned with the plug base axis and the plug axis, the clamp including a plurality of mating surfaces that define a clamp bore. At least a portion of the base mating portion and at least a portion of the tip mating portion are disposed in the clamp bore such that the base mating portion and the tip mating portion each engage at least one of the plurality of mating surfaces of the clamp.

In accordance with a second exemplary aspect of the present invention, a method of forming a valve plug assembly for use in a control valve assembly, the control valve assembly having a valve stem, a fluid flow passageway, and a valve seat disposed in the fluid flow passageway, is provided. The method includes providing a valve plug base including a base body portion and a base mating portion coupled to the base body portion, arranging the base body portion for attachment to the valve stem, selecting a valve plug tip including a tip body portion and a tip mating portion coupled to the tip body portion, providing a clamp defining a clamp bore, disposing at least a portion of the base mating portion and at least a portion of the tip mating portion in the clamp bore, and inserting a plurality of fasteners into a plurality of apertures formed in the clamp, thereby removably coupling the valve plug tip to the valve plug base.

In accordance with a third exemplary aspect of the present invention, a valve plug assembly is provided for use in a control valve assembly having a valve stem, a fluid flow passageway, and a valve seat disposed in the fluid flow passageway. The valve plug assembly includes a valve plug base, a valve plug body tip, and a clamp that removably couples the valve plug body tip to the valve plug base. The valve plug base extends along a plug base axis and includes a base mating portion. The valve plug body tip extends along a plug axis coaxially aligned with the plug base axis, and is made of a ceramic or a carbide material.

In further accordance with the foregoing first, second, and/or third aspects, a valve plug assembly and/or method may further include any one or more of the following preferred forms.

In accordance with one preferred form, the clamp includes a first clamp portion and a second clamp portion removably coupled to the first clamp portion.

In accordance with another preferred form, a plurality of fasteners are removably disposed in a plurality of apertures, respectively, formed in each of the first and second clamp portions.

In accordance with another preferred form, the plurality of mating surfaces includes a first mating surface, a second mating surface, and a substantially frustoconical mating surface extending between the first and second mating surfaces, and the base mating portion engages the first mating surface, the tip mating portion engages the second mating surface, and at least one of the base mating portion and the tip mating portion engage the substantially frustoconical mating surface. The first mating surface may include a first, cylindrical mating surface and the second mating surface may include a second, cylindrical mating surface.

In accordance with another preferred form, the plurality of mating surfaces includes a first mating surface, a second, substantially frustoconical mating surface, a third mating surface, a fourth, substantially frustoconical mating surface, and a fifth mating surface, and the base mating portion engages the first mating surface, the second, substantially frustoconical mating surface, and the third mating surface, and the tip mating portion engages the third mating surface, the fourth, substantially frustoconical mating surface, and the fifth mating surface.

In accordance with another preferred form, the valve plug tip includes a first, cylindrical portion and a second, frustoconical portion extending from the first, cylindrical portion, and the second, frustoconical portion includes the sealing surface of the valve plug tip.

In accordance with another preferred form, the valve plug base extends along the plug base axis from a first end to a second end, the first end of the valve plug base is arranged for attachment to the valve stem, the base mating portion is formed at or proximate to the second end, the valve plug tip extends along the plug axis from a first end to a second end, the sealing surface is arranged at or proximate the second end of the valve plug tip, and the the clamp extends along the clamp axis from a first end to a second end. The base body portion may define the first end of the valve plug base, the first end of the clamp may engage the base body portion of the valve plug base and the second end of the clamp may engage the tip body portion of the valve plug tip.

In accordance with another preferred form, the base body portion is integrally formed with the base mating portion.

In accordance with another preferred form, the tip mating portion has an outer diameter that is less than an outer diameter of the tip body portion.

In accordance with another preferred form, the base mating portion has an outer diameter that is less than an outer diameter of the base body portion.

In accordance with another preferred form, the valve plug tip is made of a ceramic or carbide material.

In accordance with another preferred form, an end of the base mating portion is positioned against an end of the tip mating portion.

In accordance with another preferred form, an entirety of the base mating portion and an entirety of the tip mating portion are disposed in the clamp bore.

In accordance with another preferred form, the plurality of fasteners are removed from the plurality of apertures, the portion of the tip mating portion are removed from the clamp bore, thereby decoupling the valve plug tip from the valve plug base, a second valve plug tip is selected, at least a portion of a tip mating portion of the second valve plug tip is disposed in the clamp bore, the plurality of fasteners are inserted into the plurality of apertures, thereby removably coupling the second valve plug tip to the valve plug base. The clamp may include a plurality of mating surfaces defining the clamp bore, the plurality of mating surfaces including a first mating surface, a second mating surface, and a substantially frustoconical mating surface extending between the first and second mating surfaces, and the base mating portion may be positioned in engagement with the first mating surface, the tip mating portion may be positioned in engagement with the second mating surface, and at least one of the base mating portion and the tip mating portion may be positioned in engagement with the substantially frustoconical mating surface.

DETAILED DESCRIPTION OF THE INVENTION

The present disclosure is generally directed to a valve plug assembly that is configured for use in a control valve assembly and includes a valve plug base and a valve plug tip that can be removably coupled to the valve plug base via a clamp. Thus, the valve plug tip can be removably coupled to the valve plug base without having to form threads on the valve plug tip, which, as noted above, is difficult if not impossible when the valve plug tip is made of a ceramic or carbide material. In other words, the valve plug tip can (but need not) be made of a ceramic or carbide material (when, for example, it is desirable to have a valve plug tip that is corrosion and erosion resistant), and, at the same time, need not be permanently coupled to the valve plug base (by, for example, brazing or stress fitting). As a result, when it is necessary to replace the valve plug tip (e.g., when the valve plug tip is damaged), the valve plug tip can be quickly, cost effectively, and easily removed and replaced with another valve plug tip, including a valve plug tip made of a similar or different material(s), without having to replace the entire valve plug assembly.

Figure 1:
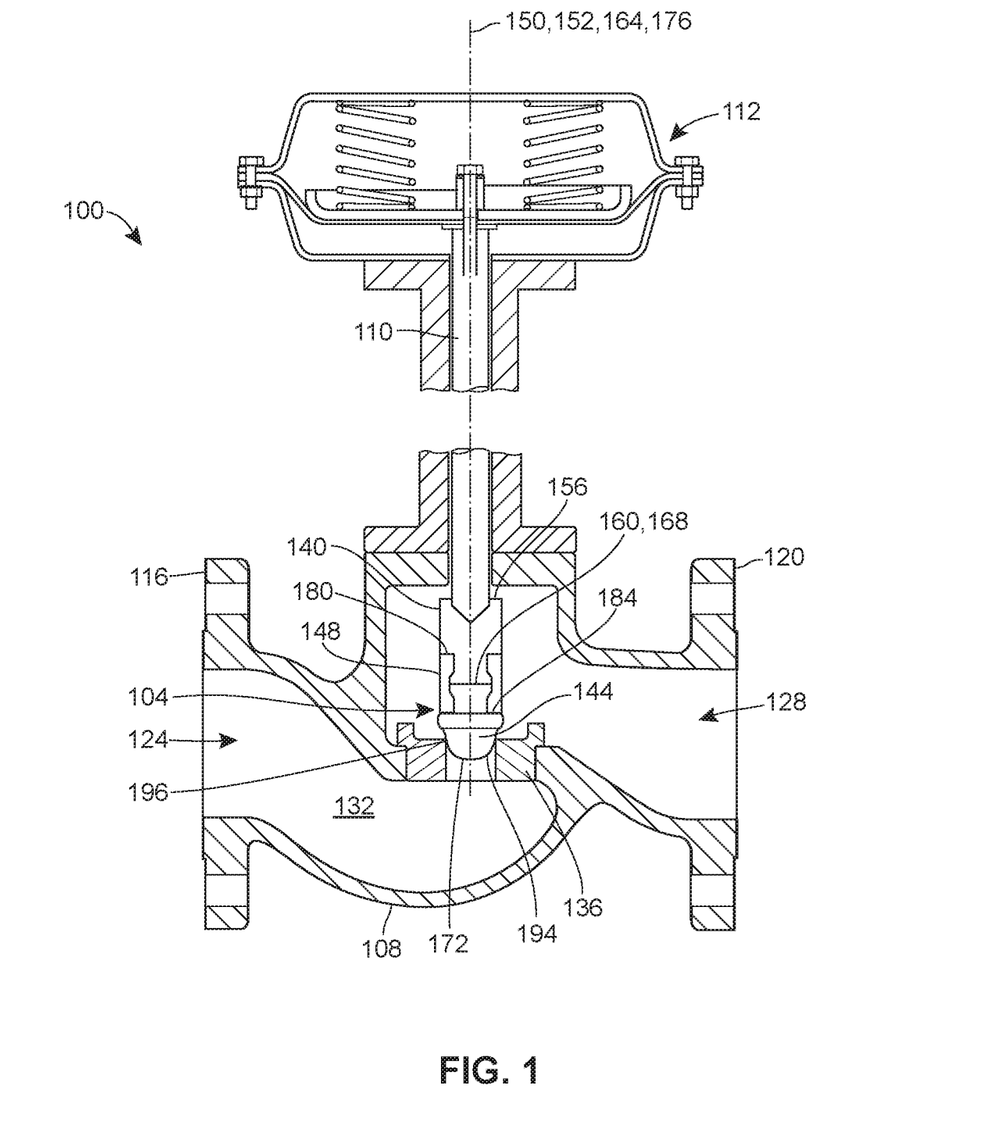
FIG. 1 is a sectional view of a control valve assembly that employs a valve plug assembly constructed in accordance with the teachings of the present disclosure.

FIG. 1 illustrates one example of a control valve assembly 100 that employs a valve plug assembly 104 constructed in accordance with the teachings of the present disclosure. The control valve assembly 100 in this example is a sliding plug base valve assembly that includes a valve body 108, the valve plug assembly 104, which is movably disposed in an interior portion of the valve body 108, a valve stem 110 coupled to the valve plug assembly 104, and an actuator 112 configured to control the position of the valve plug assembly 104 within the valve body 108 via the valve stem 110. In other examples, the control valve assembly 100 may be a rotary valve or other type of valve assembly and/or may include different, additional, or fewer components.

The valve body 108 may include opposite mounting flanges 116, 120 for mounting the valve 100 in, for instance, a pipeline system (not shown). The valve body 108 also includes a fluid inlet 124, a fluid outlet 128, and a fluid flow passageway 132 extending between and in fluid communication with the fluid inlet 124 and the fluid outlet 128. The control valve assembly 100 further includes a valve seat 136 (e.g., a seat ring) provided in the fluid flow passageway 132. In this example, the valve seat 136 is removably disposed (e.g., threaded) in the valve body 108, though the valve seat 136 can, in other examples, be fixedly disposed (e.g., welded, integrally formed) in the valve body 108.

The valve plug assembly 104 generally includes a valve plug base 140, a valve plug tip 144, and a clamp 148 that removably couples the valve plug tip 144 to the valve plug base 140 within the valve body 108. The valve plug base 140 is coupled (e.g., pinned, welded) to the valve stem 110, which extends along a longitudinal axis 150 from a first end operatively coupled to the actuator 112 and a second end disposed in the valve body 108. The valve plug base 140 extends along a longitudinal axis 152 from a first end 156, coupled to the second end of the valve stem 110, to a second end 160 positioned closer to the valve seat 136. The valve plug tip 144 likewise extends along a longitudinal axis 164 from a first end 168 to a second end 172, with the longitudinal axis 164 being co-axially aligned with the longitudinal axes 150 and 152, at least in this example. The valve plug tip 144 is disposed within the valve body 108 and is generally movable relative to the valve seat 136 to control fluid flow through the fluid flow passageway 132. The clamp 148 also extends along a longitudinal axis 176 from a first end 180 to a second end 184, with the longitudinal axis 176 being co-axially aligned with the longitudinal axes 150, 152, 164, at least in this example. In other examples, the valve plug base 140, the valve plug tip 144, and/or the clamp 148 can be arranged differently relative to the various axes 152, 164, 176 and/or one another.

The actuator 112 in this example takes the form of a conventional spring and diaphragm actuator. Thus, further details of the actuator 112 are omitted for the sake of brevity. In operation, pressurized air is supplied to the valve actuator 112, which in turn axially displaces the valve plug assembly 104 relative to the valve seat 136. More particularly, the valve actuator 112 axially displaces the valve stem 110, which in turn axially displaces the valve plug base 140 and the valve plug tip 144 (coupled to the valve plug base 140 via the clamp 148) relative to the valve seat 136 between a first, closed, position, in which a sealing surface 194 located at or proximate the second end 172 of the valve plug tip 144 sealingly engages a seating surface 196 of the valve seat 136, and a second, open, position, in which the sealing surface 194 of the valve plug tip 144 is spaced from the seating surface 196 of the valve seat 136. It will be appreciated that when the valve plug tip 144 is in its first position, fluid is prevented from flowing from the fluid inlet 124 to the fluid outlet 128 via the fluid flow passageway 132, but when the valve plug tip 144 is in its second position, fluid may flow from the fluid inlet 124 to the fluid outlet 128 via the fluid flow passageway 132.

FIGS. 2-5 illustrate the valve plug assembly 104 in further detail. As discussed above, the valve plug base 140 and the valve plug tip 144 are removably coupled to one another via the clamp 148. The valve plug base 140 generally includes a base body portion 200 and a base mating portion 204 that is coupled to (e.g., integrally formed with) and extends outward (downward in FIG. 2) from the base body portion 200. The valve plug tip 144 generally includes a tip body portion 212 and a tip mating portion 216 that is coupled to (e.g., integrally formed with) and extends outward (upward in FIG. 2) from the tip body portion 212. The clamp 148 has a clamp bore 220 that is sized to receive both the base mating portion 204 and the tip mating portion 216.

Figure 2:
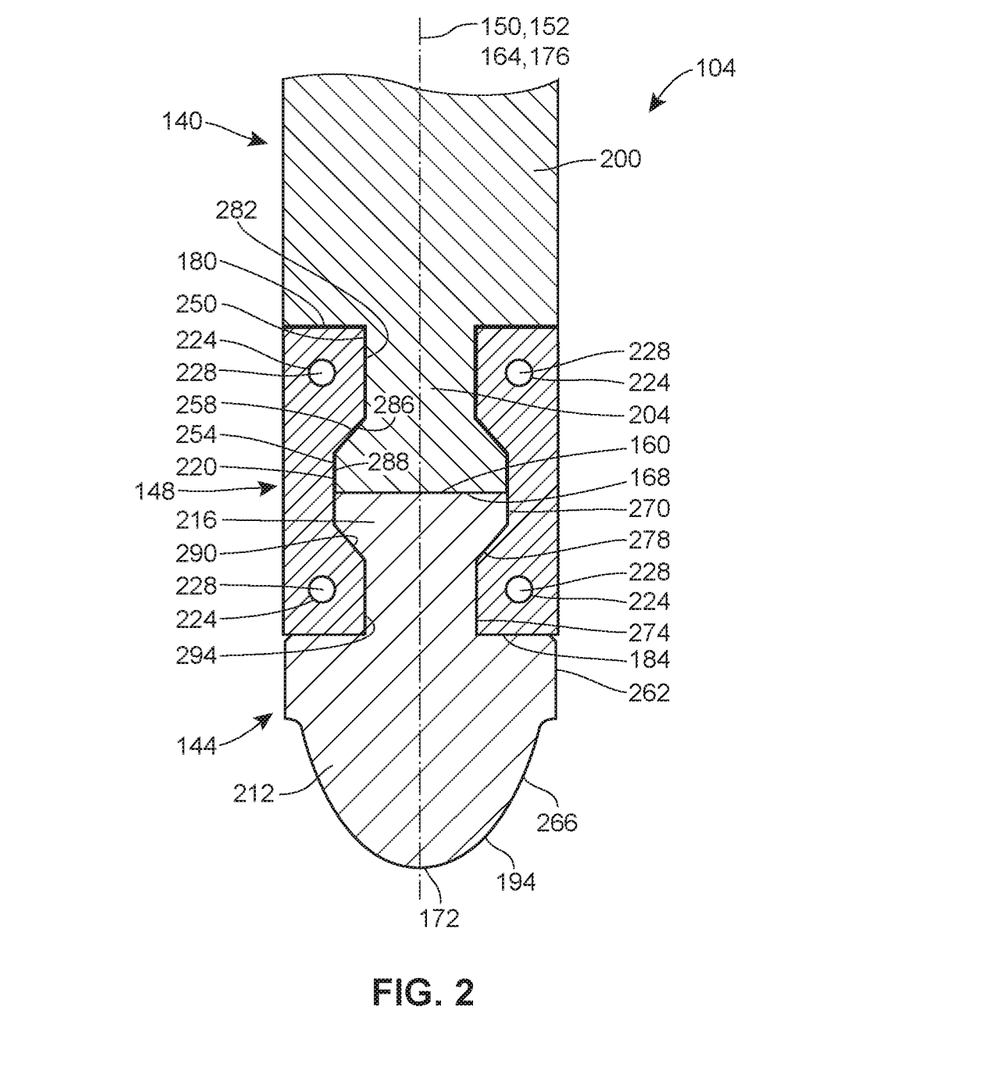
FIG. 2 is a close-up view of the valve plug assembly of FIG. 1.
Figure 3:
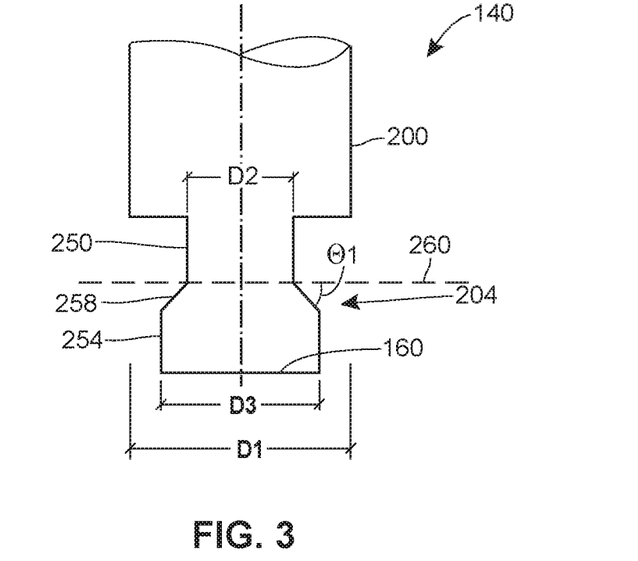
FIG. 3 is a close-up view of a portion of a valve plug base of the valve plug assembly of FIG. 2.

As best illustrated in FIGS. 2 and 3, the base body portion 200 in this example has a cylindrical or substantially cylindrical shape, while the base mating portion 204 in this example has a first, cylindrical or substantially cylindrical surface 250, a second, cylindrical or substantially cylindrical surface 254, and a third, frustoconical or substantially frustoconical surface 258 that extends between the first surface 250 and the second surface 254. The first surface 250, which is positioned immediately adjacent the base body portion 200 of the valve plug base 140, has a diameter D2 that is less than the diameter D1 of the base body portion 200. The third surface 258 extends radially outward from the first surface 250 and is preferably oriented at an angle θ1 of between approximately 5 degrees and approximately 85 degrees relative to a transverse axis 260 that intersects the longitudinal axis 152, and, more preferably, at an angle θ1 of between approximately 25 degrees and approximately 65 degrees relative to the axis 260. Thus, the third surface 258 is oriented, at least in this example, so that the second surface 254 has a diameter D3 that is greater than the diameter D2 of the first surface 250 but that is less than (or equal to) the diameter D1 of the base body portion 200. As also illustrated in FIGS. 2 and 3, the second surface 254 defines the second end 160 of the valve plug base 140.

Figure 4:
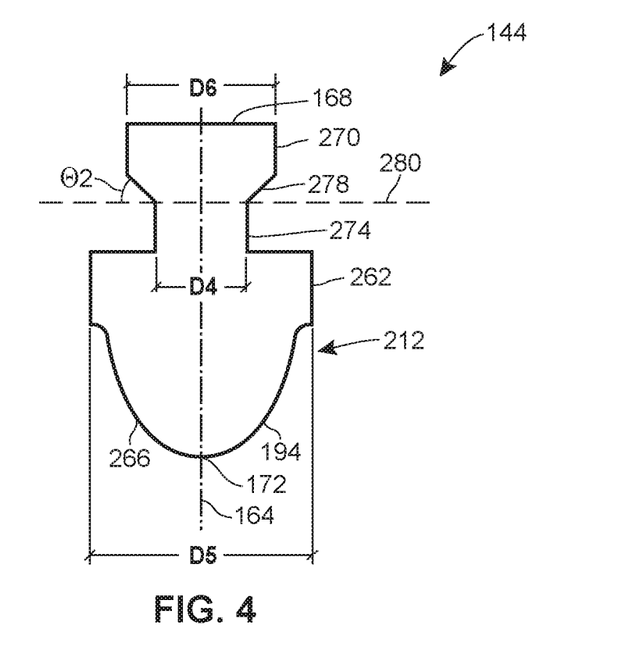
FIG. 4 is a close-up view of a valve plug tip of the valve plug assembly of FIG. 2.

As best illustrated in FIGS. 2 and 4, the tip body portion 212 in this example has a first, cylindrical or substantially cylindrical surface 262 and a second, frustoconical or substantially frustoconical surface 266 that extends outward (downward in FIG. 2) from the surface 262 and defines the second end 172 of the valve plug tip 144. The second surface 266 tapers as it extends outward from the surface 262 to the second end 172 and, at least in this example, includes or defines the sealing surface 194 of the valve plug tip 144. As also illustrated in FIGS. 2 and 4, the tip mating portion 216 in this example is a mirror image of the base mating portion 204, in that it includes a first, cylindrical or substantially cylindrical surface 270, a second, cylindrical or substantially cylindrical surface 274, and a third, frustoconical or substantially frustoconical surface 278 that extends between the first surface 270 and the second surface 274. The second surface 274, which is positioned immediately adjacent the tip body portion 212 of the valve plug tip 144, has a diameter D4 that is less than a diameter D5 of the second surface 262 of the tip body portion 212 (which may be equal to, greater than, or less than the diameter D1 of the base body portion 200). The third surface 278 extends radially outward from the second surface 274 and is preferably oriented at an angle θ1 of between approximately 5 degrees and approximately 85 degrees relative to the transverse axis 260, and, more preferably, at an angle θ1 of between approximately 25 degrees and approximately 65 degrees relative to a transverse axis 280 that intersects the longitudinal axis 164. Thus, the third surface 278 is oriented, at least in this example, so that the first surface 270 has a diameter D6 that is greater than the diameter D4 of the second surface 274 but that is less than (or equal to) the diameter D5 of the tip body portion 212. As also illustrated, the first surface 270 defines the first end 168 of the valve plug tip 144.

Figure 5:
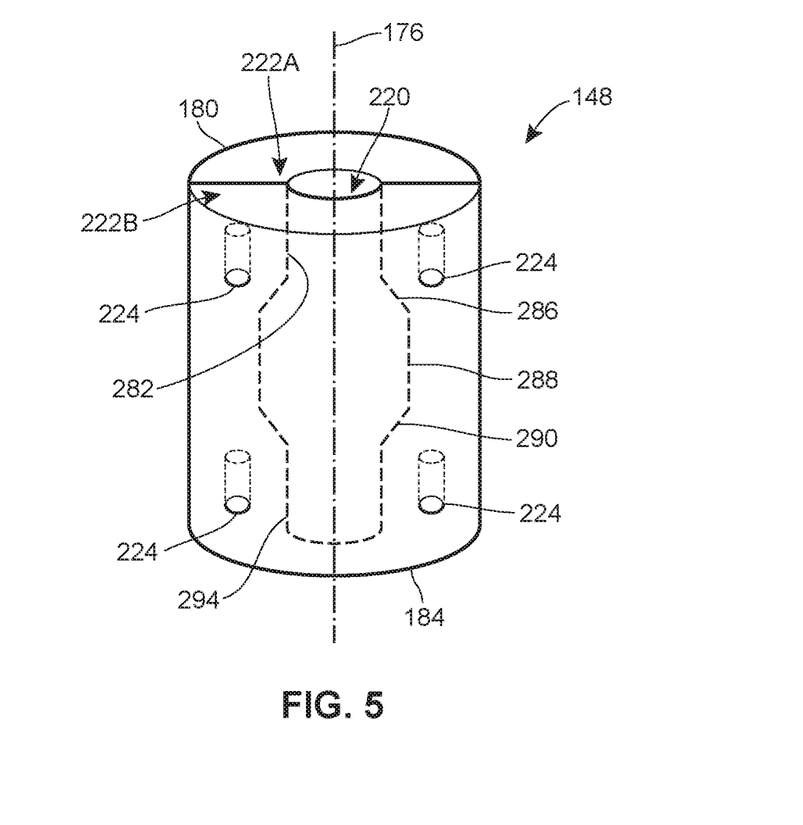
FIG. 5 is a perspective view of a clamp of the valve plug assembly that is configured to removably couple the plug tip to the plug base.

As best illustrated in FIG. 5, the clamp 148 in this example is a two-piece clamp. More particularly, the clamp 148 includes first and second, identical clamp pieces 222A, 222B that, when removably coupled to one another, form or define the clamp bore 220. In this example, the first and second clamp portions 222A, 222B are removably coupled to one another via four fasteners (e.g., screws) 228 disposed in four apertures 224 formed in and extending through each of the portions 222A, 222B, as illustrated in FIG. 2. In other examples, however, the first and second clamp portions 222A, 222B can be removably coupled to one another in a different manner (e.g., via more or less fasteners). Further, the clamp 148 can instead be a one-piece clamp or be formed of more than two pieces.

As best illustrated in FIGS. 2 and 5, the clamp 148 generally includes a plurality of mating surfaces that extend between the first and second ends 180, 184 of the clamp and together define the clamp bore 220. In this example, the clamp 148 includes five such mating surfaces—a first, cylindrical surface 282, a second, frustoconical or substantially frustoconical surface 286, a third, cylindrical surface 288, a fourth, frustoconical or substantially frustoconical surface 290, and a fifth, cylindrical surface 294. The first surface 282 extends outward (downward, when viewed in FIG. 2) from the first end 180 of the clamp 148 along the longitudinal axis 176. The second surface 286 extends radially outward from the first surface 282 and is preferably oriented at an angle of between approximately 5 degrees and approximately 85 degrees relative to the longitudinal axis 176, and, more preferably, at an angle of between approximately 25 degrees and approximately 65 degrees relative to the longitudinal axis 176. Thus, the third surface 288, which extends outward (downward, when viewed in FIG. 2) from an end of the second surface 286, has an inner diameter that is larger than an inner diameter of the first surface 282. The fourth surface 290 extends radially inward from the third surface 288 and is preferably oriented at an angle of between approximately 5 degrees and approximately 85 degrees relative to the longitudinal axis 176, and, more preferably, at an angle of between approximately 25 degrees and approximately 65 degrees relative to the longitudinal axis 176. Thus, the fifth surface 294, which extends outward (downward, when viewed in FIG. 2) from an end of the fourth surface 290 to the second end 184, has an inner diameter that is smaller than the inner diameter of the third surface 288. The inner diameter of the fifth surface 294 may be greater than, less than, or equal to the inner diameter of the first surface 282.

It will be appreciated that in other examples, the base body portion 200, the base mating portion 204, the tip body portion 212, and the tip mating portion 216 may have any number of different suitable shapes and sizes. As an example, the base mating portion 204 may not include the third, frustoconical or substantially frustoconical surface 258 or may include additional frustoconical or substantially frustoconical surfaces (or other non-cylindrically shaped surfaces). Similarly, the tip mating portion 216 may not include the third, frustoconical or substantially frustoconical surface 278 or may include additional frustoconical or substantially frustoconical surfaces (or other non-cylindrical shaped surfaces). Likewise, the tip body portion 212 may not include the second, frustoconical or substantially frustoconical surface 266 or may include additional frustoconical or substantially frustoconical surfaces (or other non-cylindrical shaped surfaces). As another example, any one or more of the diameters D1-D6 may vary from what is illustrated in FIGS. 2-5. In some examples, the tip mating portion 216 may be different than (i.e., not a mirror image of) the base mating portion 204. In these and any additional alternative examples, the clamp 148, and particularly the clamp bore 220, may have a different shape and size to accommodate the differently shaped and sized portions 204 and 216. More particularly, when the base mating portion 204 and/or the tip mating portion 216 vary from what is illustrated in FIGS. 2-5, the clamp 148 may include more, less, or different mating surfaces that define the clamp bore 220 and matingly engage the base mating portion 204 and the tip mating portion 216.

In any event, to couple the valve plug base 140 and the valve plug tip 144 to one another via the clamp 148, the valve plug base 140, the valve plug tip 144, and the first and second clamp pieces 222A, 222B are brought together or otherwise positioned such that the base mating portion 204 of the valve plug base 140 and the tip mating portion 216 of the valve plug tip 144 are entirely disposed in the clamp bore 220, as illustrated in FIG. 2. More particularly, the base mating portion 204 is disposed in the clamp bore 220 such that the first surface 250 of the base mating portion 204 engages (i.e., directly contacts) the first mating surface 282, the second surface 254 of the base mating portion 204 engages (i.e., directly contacts) a first portion of the third mating surface 288, and the third surface 258 of the base mating portion 204 engages (i.e., directly contacts) the second surface 286. Similarly, the tip mating portion 216 is disposed in the clamp bore 220 such that the first surface 270 of the tip mating portion 216 engages (i.e., directly contacts) a second portion of the third mating surface 288, the second surface 274 of the tip mating portion 216 engages (i.e., directly contacts) the fifth mating surface 294, and the third surface 278 of the tip mating portion 216 engages (i.e., directly contacts) the fourth mating surface 290. Thus, in this example, the first end 180 of the clamp 148 engages (i.e., directly contacts) the base body portion 200, and the second end 184 of the clamp 148 engages (i.e., directly contacts) the tip body portion 216.

Additionally, in this example, the second end 160 of the valve plug base 140 and the first end 168 of the valve plug tip 144 are both disposed within the clamp bore 220. The second end 160 and the first end 168 may be seated directly against one another (i.e., such that the ends 160, 168 are arranged end-to-end), as illustrated in FIG. 2, so that the base mating portion 204 and the tip mating portion 216 are in direct contact with one another. Alternatively, the ends 160, 168 may be spaced from, but positioned immediately adjacent, one another, such that the base mating portion 204 and the tip mating portion 216 are spaced from, but positioned immediately adjacent, one another. In such an alternative example, a spacer or sealing element may be disposed between the ends 160, 168. Further, it will be appreciated that the base mating portion 204 and the tip mating portion 216 may be arranged differently in the clamp bore 220 and/or relative to one another when the clamp 148 couples the valve plug base 140 and the valve plug tip 144 together. As an example, the base mating portion 204 and/or the tip mating portion 216 may only be partially disposed, rather than entirely disposed, in the clamp bore 220.

When the valve plug base 140 and the valve plug tip 144 are so arranged, the fasteners 228 are disposed in the apertures 224 of the first clamp piece 222A and the apertures 224 of the second clamp piece 222B (which are aligned with the apertures 224 of the first clamp piece 222A). The fasteners 228 are preferably countersunk into the apertures 224, though this is not required. In any case, insertion of the fasteners 228 not only securely couples the first and second clamp pieces 222A, 222B together (effectively forming the clamp 148), but also securely retains the base mating portion 204 and the tip mating portion 216 within the clamp bore 220. In turn, the valve plug tip 144 is securely coupled to the valve plug base 140, with the valve plug base 140, the valve plug tip 144, and the clamp 144 forming a tight axial joint that helps to prevent the valve plug tip 144 from rotating relative to the valve plug base 140 during operation.

At the same time, the valve plug tip 144 can be quickly and easily decoupled or separated from the valve plug base 140 by removing the fasteners 228 and, in turn, removing the clamp 148. Thus, when it is desired to replace the valve plug tip 144 (e.g., because the valve plug tip 144 fails or is otherwise damaged during operation), the valve plug tip 144 can be removed and replaced with a different valve plug tip 144 (e.g., a new valve plug tip 144, e.g., a refurbished new valve plug tip 144), all while using simple, standard tools (e.g., a screwdriver) and fasteners 228. In other words, the valve plug tip 144 can be removed and replaced without necessitating the replacement of the entire valve plug assembly 104, which, as is noted above, is a costly and time-consuming process.

As a result, the valve plug base 140 and the valve plug tip 144 can be easily and cost-efficiently manufactured from any suitable material(s). More particularly, as an example, the valve plug base 140 can be made from titanium, stainless steel, a super alloy or a high-performance alloy like INCONEL™ (e.g., Inconel 718) or HASTELLOY™, another type of high-nickel alloy, some other alloy, or another suitable material, while the valve plug tip 144 can be partially or entirely made of or from a ceramic material, a carbide material (e.g., tungsten carbide), or another material that resists corrosion and erosion. However, it will be appreciated that the valve plug tip 144 need not be made of a material that resists corrosion and/or erosion, and can be made of any suitable material. Moreover, in other examples, the valve plug base 140 and the valve plug tip 144 can be made of the same material(s), e.g., Inconel 718. In some cases, e.g., for some given applications, a valve plug tip 144 made of a first material (e.g., a ceramic material) can be removed and replaced with a valve plug tip 144 made of a second material different from the first material (and similar to or different from the material(s) from which the valve plug base 140 is made). Finally, the clamp 148 can be made from the same material(s) as the valve plug base 140 and/or the valve plug tip 144. As an example, the clamp 148 can be partially or entirely made of or from Inconel 718.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A valve plug assembly for use in a control valve assembly having a valve stem, a fluid flow passageway, and a valve seat disposed in the fluid flow passageway, the valve plug assembly comprising:
    a valve plug base extending along a plug base axis, the valve plug base including a base body portion attachable to the valve stem and a base mating portion coupled to the base body portion;
    a valve plug tip extending along a plug axis coaxially aligned with the plug base axis, the valve plug tip having a tip body portion and a tip mating portion coupled to the tip body portion, the tip body portion having a sealing surface arranged to sealingly engage the valve seat; and
    a clamp that removably couples the valve plug tip to the valve plug base, the clamp extending along a clamp axis coaxially aligned with the plug base axis and the plug axis, the clamp comprising a plurality of mating surfaces that define a clamp bore,
    wherein at least a portion of the base mating portion and at least a portion of the tip mating portion are disposed in the clamp bore such that (i) the base mating portion and the tip mating portion each engage at least one of the plurality of mating surfaces of the clamp, and (ii) an end of the valve plug base is seated directly against an end of the valve plug tip,
    wherein the base body portion is disposed outside of the clamp bore,
    wherein the base mating portion comprises a first cylindrical surface and a second cylindrical surface having a diameter larger than a diameter of the first cylindrical surface,
    wherein the plurality of mating surfaces of the clamp comprises a cylindrical mating surface that engages both the tip mating portion and the second cylindrical surface of the base mating portion,
    wherein the base mating portion has an outer diameter that is less than an outer diameter of the base body portion, and
    wherein the tip mating portion has an outer diameter that is less than an outer diameter of the tip body portion.

2. The valve plug assembly of claim 1, wherein the clamp comprises a first clamp portion and a second clamp portion removably coupled to the first clamp portion.

3. The valve plug assembly of claim 2, further comprising a plurality of fasteners removably disposed in a plurality of apertures, respectively, formed in each of the first and second clamp portions.

4. The valve plug assembly of claim 1, wherein the plurality of mating surfaces includes a first mating surface, a second mating surface, and a frustoconical mating surface extending between the first and second mating surfaces, wherein the base mating portion engages the first mating surface, the tip mating portion engages the second mating surface, and at least one of the base mating portion and the tip mating portion engage the frustoconical mating surface.

5. The valve plug assembly of claim 4, wherein the first mating surface comprises a first, cylindrical mating surface and the second mating surface comprises a second, cylindrical mating surface.

6. The valve plug assembly of claim 1, wherein the plurality of mating surfaces includes a first mating surface, a second frustoconical mating surface, a third mating surface, a fourth frustoconical mating surface, and a fifth mating surface, wherein the cylindrical mating surface is the third mating surface, wherein the base mating portion engages the first mating surface and the second frustoconical mating surface, and wherein the tip mating portion engages the fourth frustoconical mating surface and the fifth mating surface.

7. The valve plug assembly of claim 1, wherein the valve plug tip comprises a first, cylindrical portion and a second, frustoconical portion extending from the first, cylindrical portion, wherein the second, frustoconical portion includes the sealing surface of the valve plug tip.

8. The valve assembly of claim 1, wherein the valve plug base extends along the plug base axis from a first end to a second end, the first end of the valve plug base attachable to the valve stem, and the base mating portion formed at or proximate to the second end, wherein the valve plug tip extends along the plug axis from a first end to a second end, the sealing surface arranged at or proximate the second end of the valve plug tip, and wherein the clamp extends along the clamp axis from a first end to a second end.

9. The valve plug assembly of claim 8, wherein the base body portion defines the first end of the valve plug base, and wherein the first end of the clamp engages the base body portion of the valve plug base and the second end of the clamp engages the tip body portion of the valve plug tip.

10. The valve plug assembly of claim 1, wherein the base body portion is integrally formed with the base mating portion.

11. The valve plug assembly of claim 1, wherein the valve plug tip is made of a ceramic or carbide material.

12. The valve plug assembly of claim 1, wherein the base mating portion is spaced from the valve stem.

13. The valve plug assembly of claim 1, wherein the first cylindrical surface is disposed within the clamp bore.

14. The valve plug assembly of claim 1, wherein the clamp has a first end that directly contacts the base body portion and a second end that directly contacts the tip body portion.

15. A method of forming a valve plug assembly for use in a control valve assembly, the control valve assembly having a valve stem, a fluid flow passageway, and a valve seat disposed in the fluid flow passageway, the method comprising:
    providing a valve plug base comprising a base body portion and a base mating portion coupled to the base body portion, wherein the base mating portion comprises a first cylindrical surface and a second cylindrical surface having a diameter larger than a diameter of the first cylindrical surface;

arranging the base body portion for attachment to the valve stem;

selecting a valve plug tip comprising a tip body portion and a tip mating portion coupled to the tip body portion;

providing a clamp comprising a plurality of mating surfaces defining a clamp bore;

disposing at least a portion of the base mating portion and at least a portion of the tip mating portion in the clamp bore such that an end of the base mating portion is seated directly against an end of the tip mating portion; and inserting a plurality of fasteners into a plurality of apertures formed in the clamp, thereby removably coupling the valve plug tip to the valve plug base, wherein the base body portion is disposed outside of the clamp bore, wherein the plurality of mating surfaces of the clamp comprises a cylindrical mating surface that engages both the tip mating portion and the second cylindrical surface of the base mating portion, wherein the base mating portion has an outer diameter that is less than an outer diameter of the base body portion, and wherein the tip mating portion has an outer diameter that is less than an outer diameter of the tip body portion.

16. The method of claim 15, comprising disposing an entirety of the base mating portion and an entirety of the tip mating portion in the clamp bore.

17. The method of claim 15, wherein selecting the valve plug tip comprises selecting a first valve plug tip made of a ceramic material or a carbide material.

18. The method of claim 17, further comprising:

removing the plurality of fasteners from the plurality of apertures;

removing the portion of the tip mating portion from the clamp bore, thereby decoupling the first valve plug tip from the valve plug base;

selecting a second valve plug tip;

disposing at least a portion of a tip mating portion of the second valve plug tip in the clamp bore; and inserting the plurality of fasteners into the plurality of apertures, thereby removably coupling the second valve plug tip to the valve plug base.

19. The method of claim 18, wherein the plurality of mating surfaces includes a first mating surface, a second mating surface, and a frustoconical mating surface extending between the first and second mating surfaces, and wherein disposing at least a portion of the base mating portion and at least a portion of the tip mating portion in the clamp bore comprises positioning the base mating portion in engagement with the first mating surface, the tip mating portion in engagement with the second mating surface, and at least one of the base mating portion and the tip mating portion in engagement with the frustoconical mating surface.

20. A valve trim assembly for use in a control valve assembly having a fluid flow passageway and a valve seat disposed in the fluid flow passageway, the valve trim assembly comprising:

a valve stem; and a valve plug assembly comprising:

a valve plug base extending along a plug base axis, the valve plug base including a base body portion attached to the valve stem and a base mating portion coupled to the base body portion, wherein the base mating portion comprises a first cylindrical surface and a second cylindrical surface having a diameter larger than a diameter of the first cylindrical surface;

a valve plug body tip extending along a plug axis coaxially aligned with the plug base axis, the valve plug body tip having a tip body portion and a tip mating portion coupled to the tip body portion, the tip body portion made of a ceramic or a carbide material and having a sealing surface arranged to sealingly engage the valve seat; and a clamp that removably couples the valve plug body tip to the valve plug base, the clamp comprising a plurality of mating surfaces that define a clamp bore, wherein the base body portion is disposed outside of the clamp bore, wherein the plurality of mating surfaces of the clamp comprises a cylindrical mating surface that engages both the tip mating portion and the second cylindrical surface of the base mating portion, wherein the base mating portion has an outer diameter that is less than an outer diameter of the base body portion, and wherein the tip mating portion has an outer diameter that is less than an outer diameter of the tip body portion.

* * * * *

UNITED STATES PATENT AND TRADEMARK OFFICE
CERTIFICATE OF CORRECTION

PATENT NO. : 10,883,611 B2
APPLICATION NO. : 15/723024
DATED : January 5, 2021
INVENTOR(S) : Jonathan W. Richardson Page 1 of 1

It is certified that error appears in the above-identified patent and that said Letters Patent is hereby corrected as shown below:

In the Specification

At Column 2, Line 64, "the the" should be -- the --.

At Column 4, Line 25, "valve 100" should be -- control valve assembly 100 --.

At Column 7, Line 57, "tip body portion 216." should be -- tip body portion 212. --.

At Column 8, Line 26, "clamp 144" should be -- clamp 148 --.

In the Claims

At Column 10, Line 32, "the valve assembly of claim 1," should be -- the valve plug assembly of claim 1, --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*